US012763679B2

(12) United States Patent
Song et al.

(10) Patent No.: US 12,763,679 B2
(45) Date of Patent: Oct. 13, 2026

(54) LLC RESONANCE CONVERSION CIRCUIT

(71) Applicant: Lite-On Electronics (Guangzhou) Limited, Guangzhou (CN)

(72) Inventors: Zhi-Shun Song, Guangzhou (CN); De-Qiang Zhang, Guangzhou (CN)

(73) Assignee: LITE-ON ELECTRONICS (GUANGZHOU) LIMITED, Guangzhou (CN)

( * ) Notice: Subject to any disclaimer, the term of this patent is extended or adjusted under 35 U.S.C. 154(b) by 167 days.

(21) Appl. No.: 18/789,035

(22) Filed: Jul. 30, 2024

(65) Prior Publication Data

US 2025/0379523 A1 Dec. 11, 2025

(30) Foreign Application Priority Data

Jun. 7, 2024 (CN) ........................ 202410744341.3

(51) Int. Cl.
*H02M 3/00* (2006.01)
*H02M 3/335* (2006.01)

(52) U.S. Cl.
CPC ....... *H02M 3/015* (2021.05); *H02M 3/33569* (2013.01); *H02M 3/01* (2021.05)

(58) Field of Classification Search
CPC ..... H02M 3/01; H02M 3/015; H02M 3/33569
See application file for complete search history.

(56) References Cited

U.S. PATENT DOCUMENTS 9,515,562 B2 12/2016 Dai
2019/0044447 A1* 2/2019 Wang ................ H02M 3/33576

FOREIGN PATENT DOCUMENTS

CN 108964469 B * 9/2023 ........ H02M 3/33576

OTHER PUBLICATIONS

Taiwan Intellectual Property Office "Office Action" issued on Dec. 24, 2024, TIPO.

* cited by examiner

*Primary Examiner* — Jue Zhang
(74) *Attorney, Agent, or Firm* — WPAT, PC

(57) ABSTRACT

An LLC resonance conversion circuit is provided. The LLC resonance conversion circuit includes a primary side network, a transformer, a primary side resonance circuit and a secondary side network. The transformer includes at least on coil and at least one excitation inductor. The primary side network includes a plurality of switch elements and an input capacitor. The primary resonance circuit includes at least one resonance capacitor, at least one resonance inductor and at least one auxiliary inductance. The resonance capacitor and the resonance inductor are connected in series between the coil and the primary side network. Two terminals of the excitation inductor are connected to the coil. The auxiliary inductance is connected to the resonance inductor. The secondary side network includes a plurality of switch elements and an output capacitor. The secondary network is connected to the coil.

13 Claims, 14 Drawing Sheets

100

LLC RESONANCE CONVERSION CIRCUIT

This application claims the benefit of China application Serial No. 202410744341.3, filed Jun. 7, 2024, the disclosure of which is incorporated by reference herein in its entirety.

TECHNICAL FIELD

The disclosure relates in general to a power conversion circuit, and more particularly to an LLC resonance conversion circuit.

BACKGROUND

With the popularity of electric vehicles, the demand for charging piles is increasing day by day. Currently, the LLC resonance conversion circuit used for two-way charging piles V2G needs to be equipped with resonance capacitor and resonance inductor on both the positive and secondary sides. However, it has a complex structure and gains some problems such as poor control, high cost and bulky size.

Researchers are working hard to develop new LLC resonance conversion circuits to make the gain easier to control and improve, and to reduce costs and size.

SUMMARY

The disclosure is directed to an LLC resonance conversion circuit whose circuit architecture is changed to make the gain easier to be controlled and improved, and can reduce costs and size.

According to one embodiment, an LLC resonance conversion circuit is provided. The LLC resonance conversion circuit includes a primary side network, at least one transformer, a primary side resonance circuit and a secondary side network. The primary side network includes a plurality of switch elements and an input capacitor. The transformer includes at least one coil and at least one excitation inductor. The primary side resonance circuit includes at least one resonance capacitor, at least one resonance inductor and at least one auxiliary inductor. The resonance capacitor and the resonance inductor are connected in series between the coil and the primary side network. Two terminals of the excitation inductor are connected to the coil. The auxiliary inductor is connected to the resonance inductor. The secondary side network includes a plurality of switch elements and an output capacitor. The secondary side network is connected to the coil.

According to another embodiment, an LLC resonance conversion circuit includes a primary side network, a transformer, a primary side resonance circuit and a secondary side network. The primary side network includes four switch elements and an input capacitor. The transformer includes a coil and an excitation inductor. The primary side resonance circuit includes a resonance capacitor, a resonance inductor, an auxiliary inductor, a first switch and a second switch. The resonance capacitor and the resonance inductor are connected in series between the coil and the primary side network. Two terminals of the excitation inductor are connected to the coil. The first switch, the auxiliary inductor and the second switch are connected in series between the resonance inductor and the primary side network. The secondary side network includes four switch elements and an output capacitor. The secondary side network is connected to the coil.

According to an alternative embodiment, an LLC resonance conversion circuit is provided. The LLC resonance conversion circuit includes a primary side network, a transformer, a primary side resonance circuit and a secondary side network. The primary side network includes six switch elements and an input capacitor. The transformer includes three coils and three excitation inductors. The primary side resonance circuit includes three resonance capacitors, three resonance inductors and three auxiliary inductors. Each of the resonance capacitors and each of the resonance inductors corresponding thereto are connected in series between each of the coils corresponding thereto and the primary side network. Two terminals of each of the excitation inductors are connected to each of the coils corresponding thereto. Each of the auxiliary inductors is connected to each of the resonance inductor corresponding thereto. The secondary side network includes six switch elements and an output capacitor. The secondary side network is connected to the coils.

Figure 1:
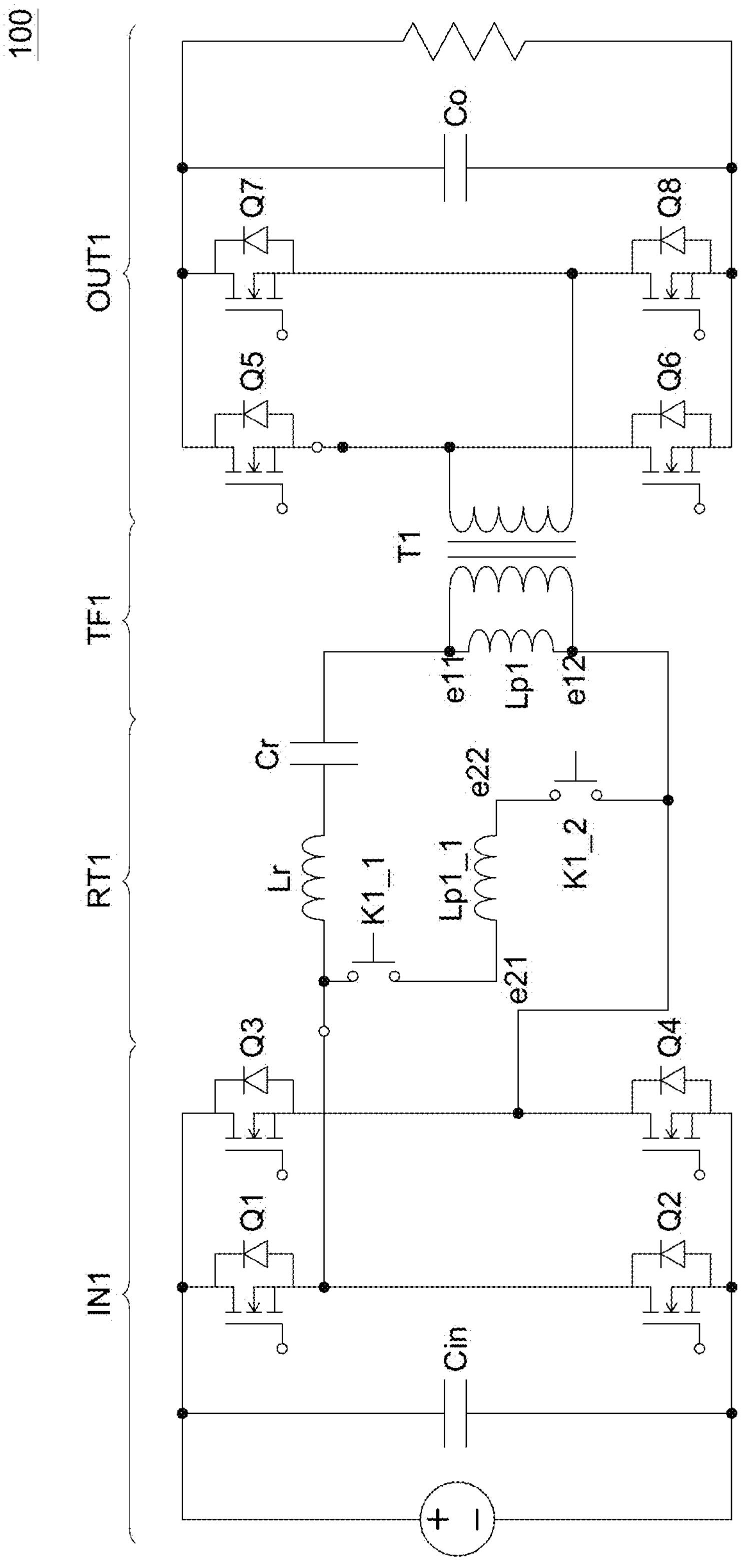
FIG. 1 illustrates a circuit diagram of an LLC resonance conversion circuit according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Please refer to FIG. 1, which illustrates a circuit diagram of an LLC resonance conversion circuit 100 according to an embodiment of the present disclosure. The LLC resonance conversion circuit 100 includes a primary side network IN1, a transformer TF1, a primary side resonance circuit RT1 and a secondary side network OUT1. The primary side network IN1 includes four switch elements Q1, Q2, Q3, Q4 and one input capacitor Cin. Each of the switch elements Q1, Q2, Q3, Q4 includes a transistor and a diode. The switch element Q1 is connected in series with the switch element Q2. The switch element Q3 is connected in series with the switch element Q4. The switch element Q1 and the switch element Q2 connected in series are connected in parallel to the input capacitor Cin. The switch element Q3 and the switch element Q4 connected in series are connected in parallel to the input capacitor Cin. The "primary side" used in this disclosure is also called the "first side", and the "secondary side" is also called the "second side".

The transformer TF1 includes coil T1 and an excitation inductor Lp1.

The primary side resonance circuit RT1 includes a resonance capacitor Cr, a resonance inductor Lr, an inductor Lp1_1, a first switch K1_1 and a second switch K1_2. The resonance capacitor Cr and the resonance inductor Lr are connected in series between the coil T1 and the primary side network IN1. A first terminal e11 and a second terminal e12 of the excitation inductor Lp1 are connected to the coil T1. The first terminal e11 of the excitation inductor Lp1 is connected to a node between the resonance capacitor Cr and the coil T1; the second terminal e12 of the excitation inductor Lp1 is connected to a node between the second switch K1_2 and the coil T1.

The first switch K1_1, the inductor Lp1_1 and the second switch K1_2 are connected in series between the resonance inductor Lr and the primary side network IN1. The first switch K1_1 is connected to the first terminal e21 of the inductor Lp1_1; the second switch K1_2 is connected to the second terminal e22 of the inductor Lp1_1. The first switch K1_1 is connected between the resonance inductor Lr and the inductor Lp1_1. The second switch K1_2 is connected between the excitation inductor Lp1 and the inductor Lp1_1.

The first switch K1_1 and the second switch K1_2 are turned on or off at the same time, so that the inductor Lp1_1 joins or withdraws from the topology.

The secondary side network OUT1 includes four switch elements Q5, Q6, Q7, Q8 and an output capacitor Co. The secondary side network OUT1 is connected to the coil T1. Each of the switch elements Q5, Q6, Q7, Q8 includes a transistor and a diode. The switch element Q5 and the switch element Q6 are connected in series. The switch element Q7 and the switch element Q8 are connected in series. The switch element Q5 and the switch element Q6 connected in series are connected in parallel to the output capacitor Co. The switch element Q7 and the switch element Q8 connected in series are connected in parallel to the output capacitor Co.

In this embodiment, the secondary side network OUT1 is directly connected to the coil T1, and there is no resonance capacitor or resonance inductor provided between the secondary side network OUT1 and the coil T1.

Figure 2:
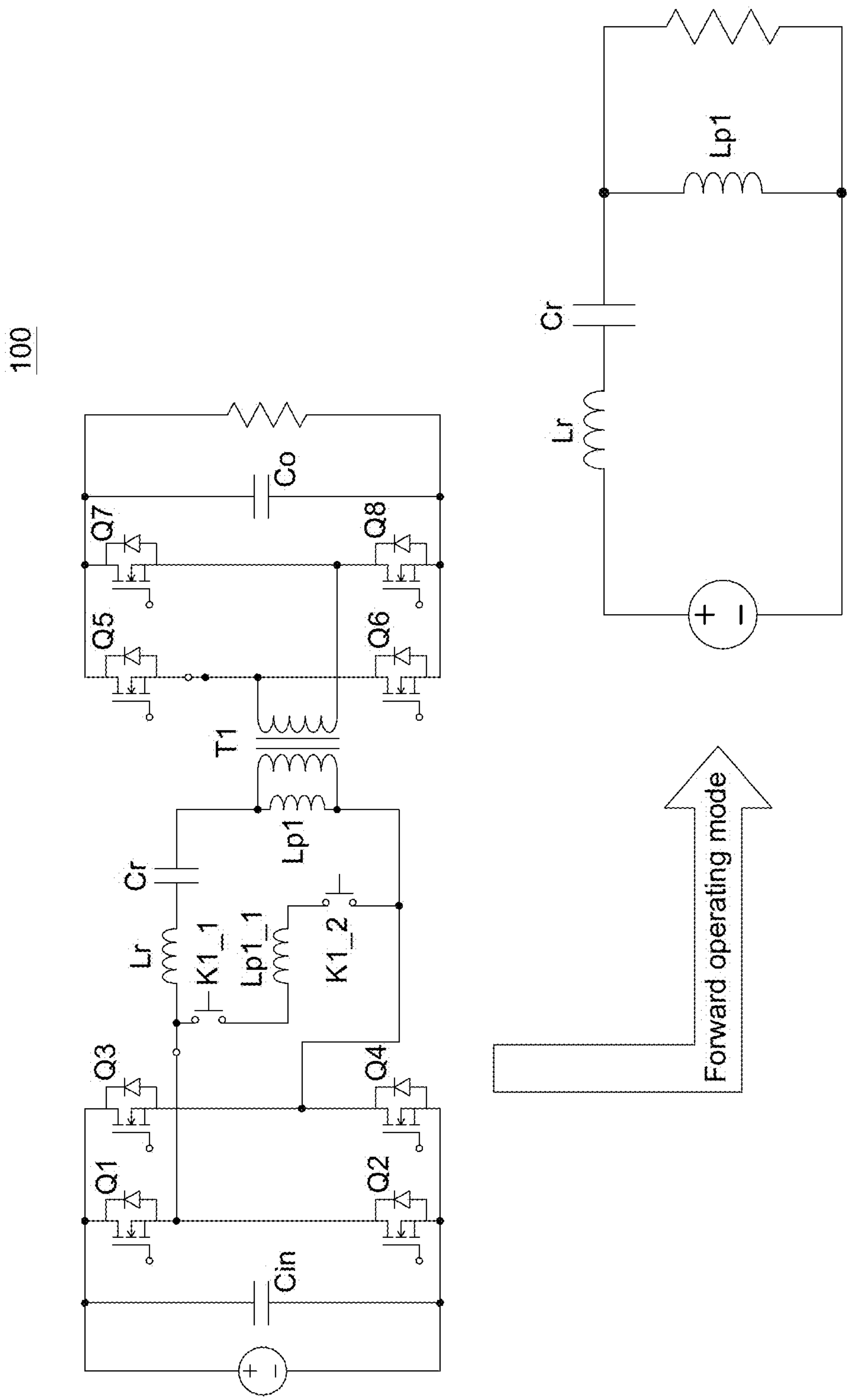
FIG. 2 illustrates an equivalent circuit diagram of the LLC resonance conversion circuit performing in a forward operating mode according to an embodiment of the present disclosure.

Please refer to FIG. 2, which illustrates an equivalent circuit diagram of the LLC resonance conversion circuit 100 performing in a forward operating mode according to an embodiment of the present disclosure. In the forward operating mode, the first switch K1_1 and the second switch K1_2 are turned off to form the equivalent circuit in FIG. 2. In the forward operating mode, the resonance inductor Lr, the excitation inductor Lp1 and the resonance capacitor Cr form an LLC circuit.

Figure 3:
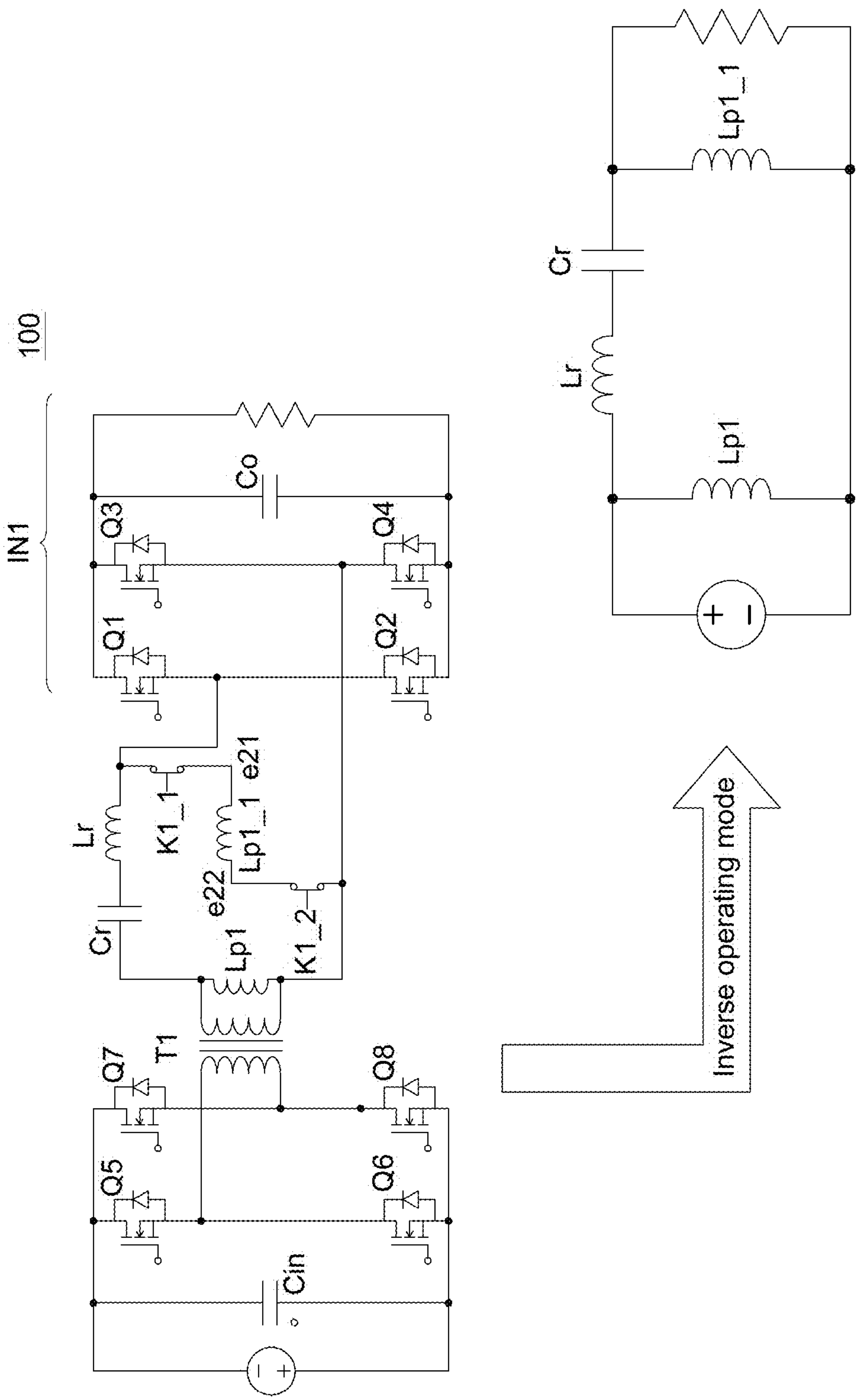
FIG. 3 illustrates an equivalent circuit diagram of the LLC resonance conversion circuit performing in an inverse operating mode according to an embodiment of the present disclosure.

Please refer to FIG. 3, which illustrates an equivalent circuit diagram of the LLC resonance conversion circuit 100 performing in an inverse operating mode according to an embodiment of the present disclosure. In the inverse operating mode, the first switch K1_1 and the second switch K1_2 are turned on. When the first switch K1_1 and the second switch K1_2 are turned on, the first terminal e21 of the inductor Lp1_1 is connected between the resonance inductor Lr and the primary side network IN1, and the second terminal e22 of the inductor Lp1_1 is connected between the coil T1 and the primary side network IN1 to form the equivalent circuit in FIG. 3. In the inverse operating mode, the resonance inductor Lr, the inductor Lp1_1 and the resonance capacitor Cr form an LLC circuit.

Figure 4:
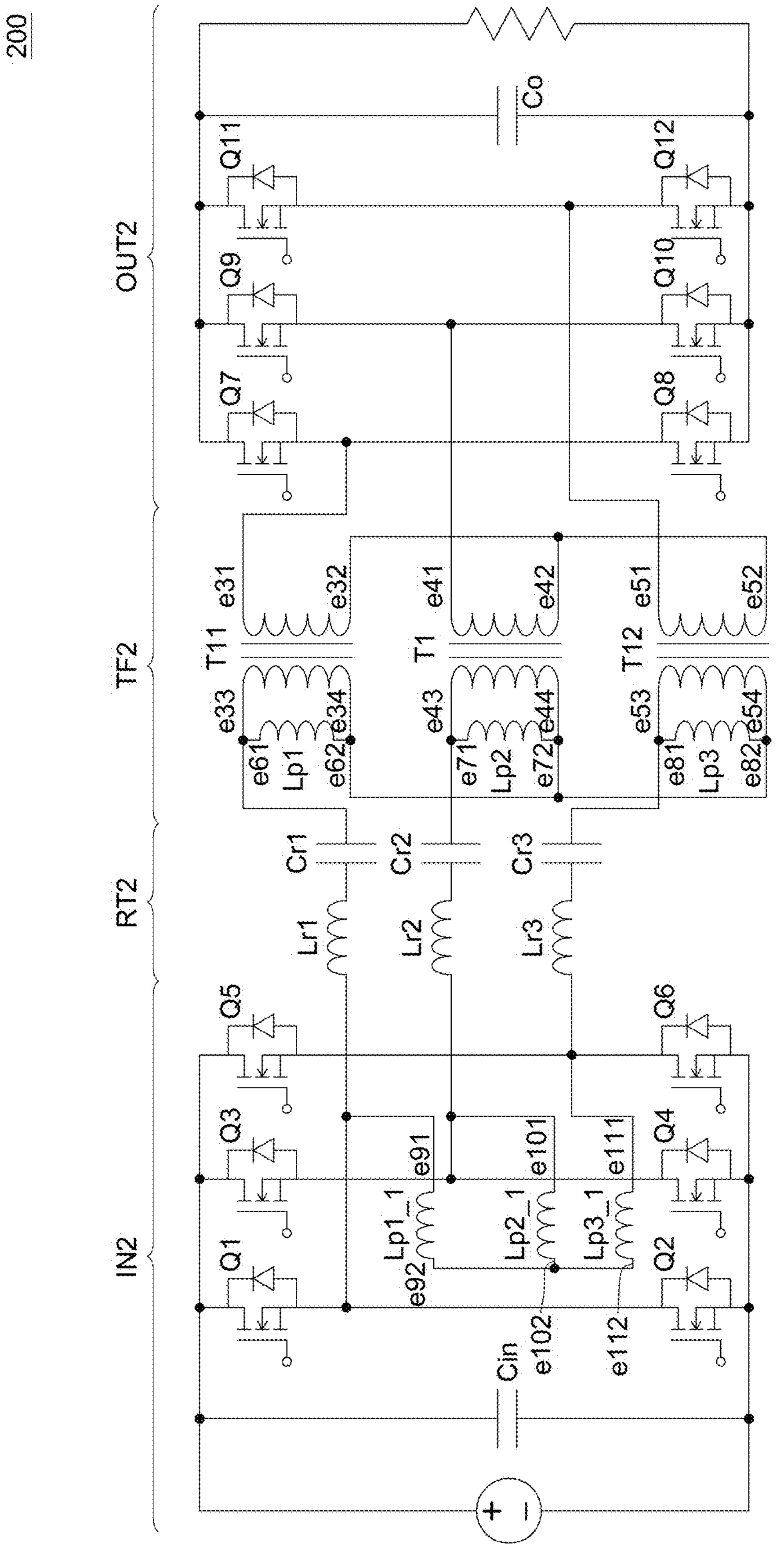
FIG. 4 illustrates a circuit diagram of an LLC resonance conversion circuit according to another embodiment of the present disclosure.

Please refer to FIG. 4, which illustrates a circuit diagram of an LLC resonance conversion circuit 200 according to another embodiment of the present disclosure. The LLC resonance conversion circuit 200 includes a primary side network IN2, a transformer TF2, a primary side resonance circuit RT2 and a secondary side network OUT2. The primary side network IN2 includes six switch elements Q1, Q2, Q3, Q4, Q5, Q6 and an input capacitor Cin. Each of switch elements Q1, Q2, Q3, Q4, Q5, Q6 includes a transistor and a diode. The switch element Q1 and the switch element Q2 are connected in series. The switch element Q3 and the switch element Q4 are connected in series. The switch element Q5 and the switch element Q6 are connected in series. The switch element Q1 and the switch element Q2 connected in series are connected in parallel to the input capacitor Cin. The switch element Q3 and the switch element Q4 connected in series are connected in parallel to the input capacitor Cin. The switch element Q5 and the switch element Q6 connected in series are connected in parallel to the input capacitor Cin.

The transformer TF2 includes three coils T1, T11, T12 and three excitation inductors Lp1, Lp2, Lp3.

In this embodiment, the three coils T1, T11, and T12 of transformer TF2 are connected in a Y-shaped connection. That is to say, the second terminals e32, e42, e52 on the lower right side of the three coils T1, T11, T12 are connected together, and the fourth terminals e34, e44, e54 on the lower left side of the three coils T1, T11, T12 are connected together. The first terminals e31, e41, e51 on the upper right side of the three coils T1, T11, T12 are connected to the secondary side network OUT2. The third terminals e33, e43, e53 on the upper left side of the three coils T1, T11, T12 are connected to the primary side resonance circuit RT2.

The first terminal e61 and the second terminal e62 of the excitation inductor Lp1 are connected to the coil T11. The first terminal e71 and the second terminal e72 of the excitation inductor Lp2 are connected to the coil T1. The first terminal e81 and the second terminal e82 of the excitation inductor Lp3 are connected to the coil T12.

The excitation inductors Lp1, Lp2, Lp3 of the transformer TF2 are connected in a Y-shaped connection. That is to say, the first terminal e61 of the excitation inductor Lp1 is connected to a node between the resonance capacitor Cr1 and the coil T11. The first terminal e71 of the excitation inductor Lp2 is connected to a node between the resonance capacitor Cr2 and the coil T1. The first terminal e81 of the excitation inductor Lp3 is connected to a node between the resonance capacitor Cr3 and the coil T12. The second terminal e62 of the excitation inductor Lp1, the second terminal e72 of the excitation inductor Lp2 and the second terminal e82 of the excitation inductor Lp3 are connected together to form the Y-shaped connection.

The primary side resonance circuit RT2 includes three resonance capacitors Cr1, Cr2, Cr3, three resonance inductors Lr1, Lr2, L3 and three inductors Lp1_1, Lp2_1, Lp3_1. The resonance capacitor Cr1 and the resonance inductor Lr1 are connected in series between the coil T11 and the primary side network IN2. The resonance capacitor Cr2 and the resonance inductor Lr2 are connected in series between the coil T1 and the primary side network IN2. The resonance capacitor Cr3 and the resonance inductor Lr3 are connected in series between the coil T12 and the primary side network IN2.

The first terminal e91 of the inductor Lp1_1 is connected to the resonance inductor Lr1 corresponding thereto. The first terminal e101 of the inductor Lp2_1 is connected to the resonance inductor Lr2 corresponding thereto. The first terminal e111 of the inductor Lp3_1 is connected to the resonance inductor Lr3 corresponding thereto. The second terminal e92 of the inductor Lp1_1, the second terminal e102 of the inductor Lp2_1 and the second terminal e112 of the inductor Lp3_1 are connected together to form a Y-shaped connection.

The secondary side network OUT2 includes six switch elements Q7, Q8, Q9, Q10, Q11, Q12 and an output capacitor Co. The secondary side network OUT2 is connected to the coil T1, T11, T12. Each of the switch elements Q7, Q8, Q9, Q10, Q11, Q12 includes a transistor and a diode. The switch element Q7 and the switch element Q8 are connected in series. The switch element Q9 and the switch element Q10 are connected in series. The switch element Q11 and the switch element Q12 are connected in series. The switch element Q7 and the switch element Q8 connected in series are connected in parallel to the output capacitor Co. The switch element Q9 and the switch element Q10 connected in series are connected in parallel to the output capacitor Co. The switch element Q11 and the switch element Q12 connected in series are connected in parallel to the output capacitor Co.

In one present embodiment, the secondary side network OUT2 is directly connected to the coils T1, T11, T12, and there is no resonance capacitor or resonance inductor disposed between the secondary side network OUT2 and the coils T1, T11, T12.

Figure 5:
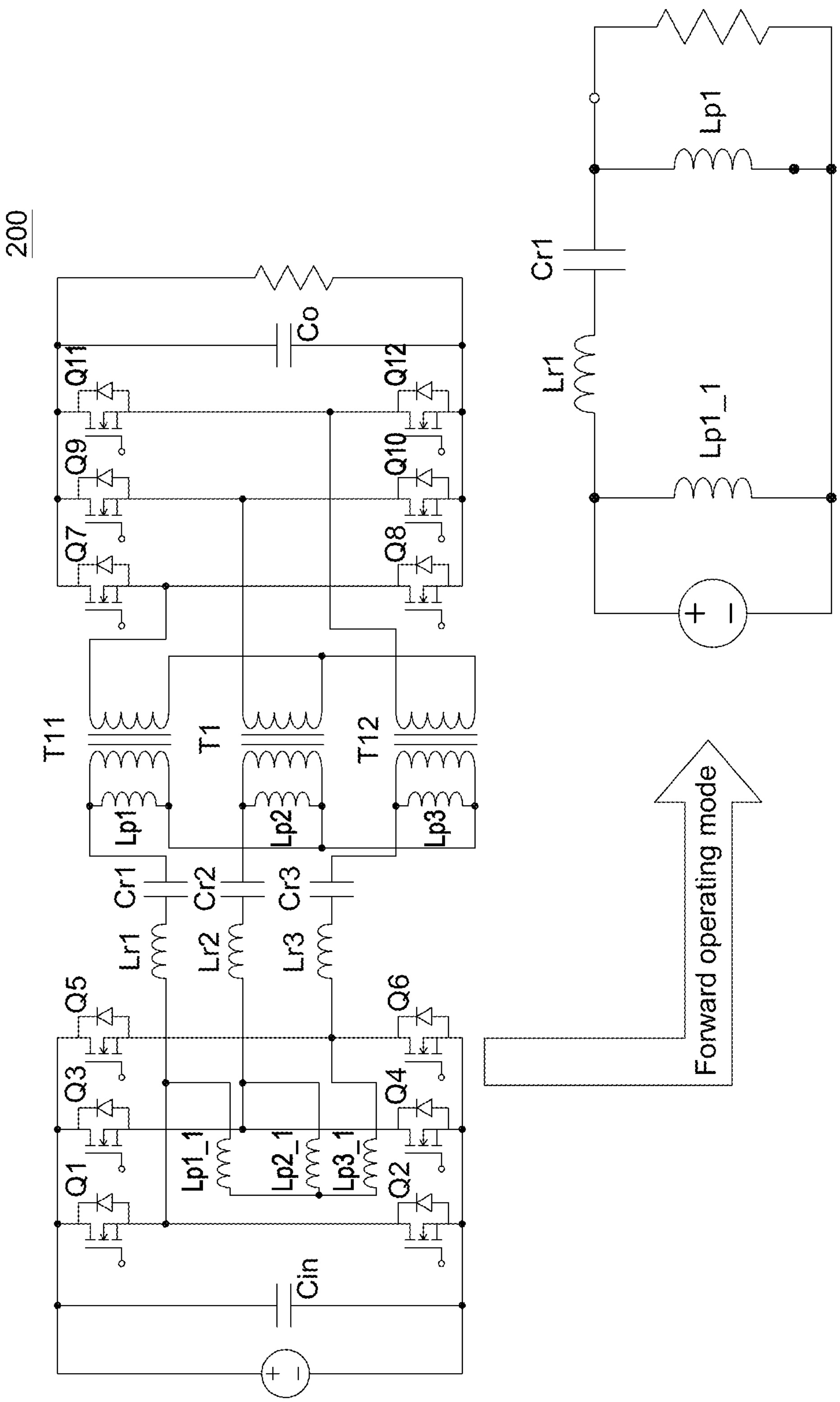
FIG. 5 illustrates an equivalent circuit diagram of the LLC resonance conversion circuit performing in the forward operating mode according to another embodiment of the present disclosure.

Please refer to FIG. 5, which illustrates an equivalent circuit diagram of the LLC resonance conversion circuit 200 performing in the forward operating mode according to another embodiment of the present disclosure. In the forward operating mode, an equivalent circuit is formed in the FIG. 5. In the forward operating mode, the resonance inductor Lr1, the excitation inductor Lp1 and the resonance capacitor Cr1 form an LLC circuit; the resonance inductor Lr2, the excitation inductor Lp2 and the resonance capacitor Cr2 form an LLC circuit; the resonance inductor Lr3, the excitation inductor Lp3 and the resonance capacitor Cr3 form an LLC circuit (FIG. 5 only shows one LLC circuit).

Figure 6:
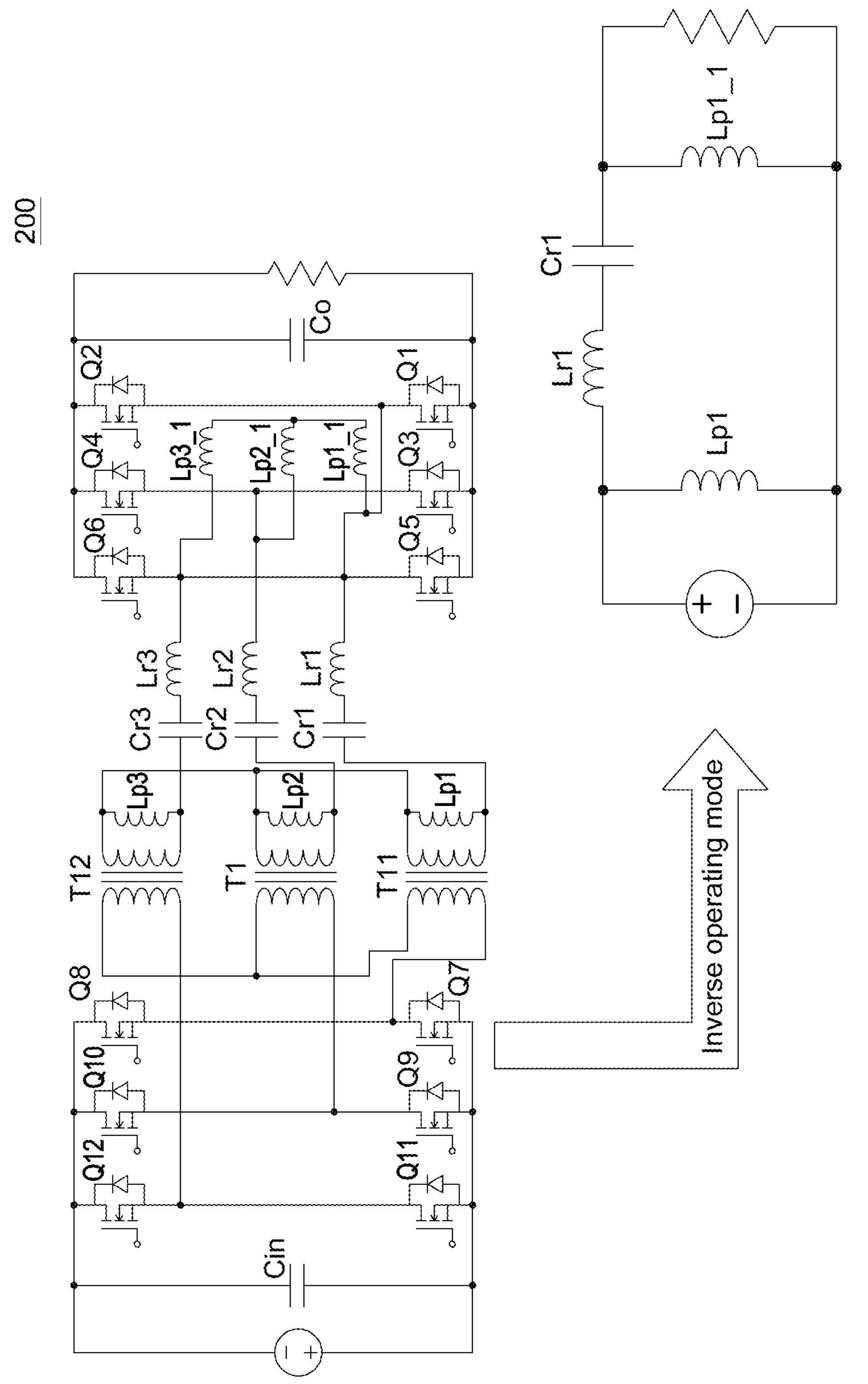
FIG. 6 illustrates an equivalent circuit diagram of the LLC resonance conversion circuit performing in the inverse operating mode according to another embodiment of the present disclosure.

Please refer to FIG. 6, which illustrates an equivalent circuit diagram of the LLC resonance conversion circuit 200 performing in the inverse operating mode according to another embodiment of the present disclosure. In the inverse operating mode, the resonance inductor Lr1, the inductor Lp1_1 and the resonance capacitor Cr1 form an LLC circuit; the resonance inductor Lr2, the inductor Lp2_1 and the resonance capacitor Cr2 form an LLC circuit, the resonance inductor Lr3, the inductor Lp3_1 and the resonance capacitor Cr3 form an LLC circuit (only one LLC circuit is shown in the FIG. 6).

Figure 7:
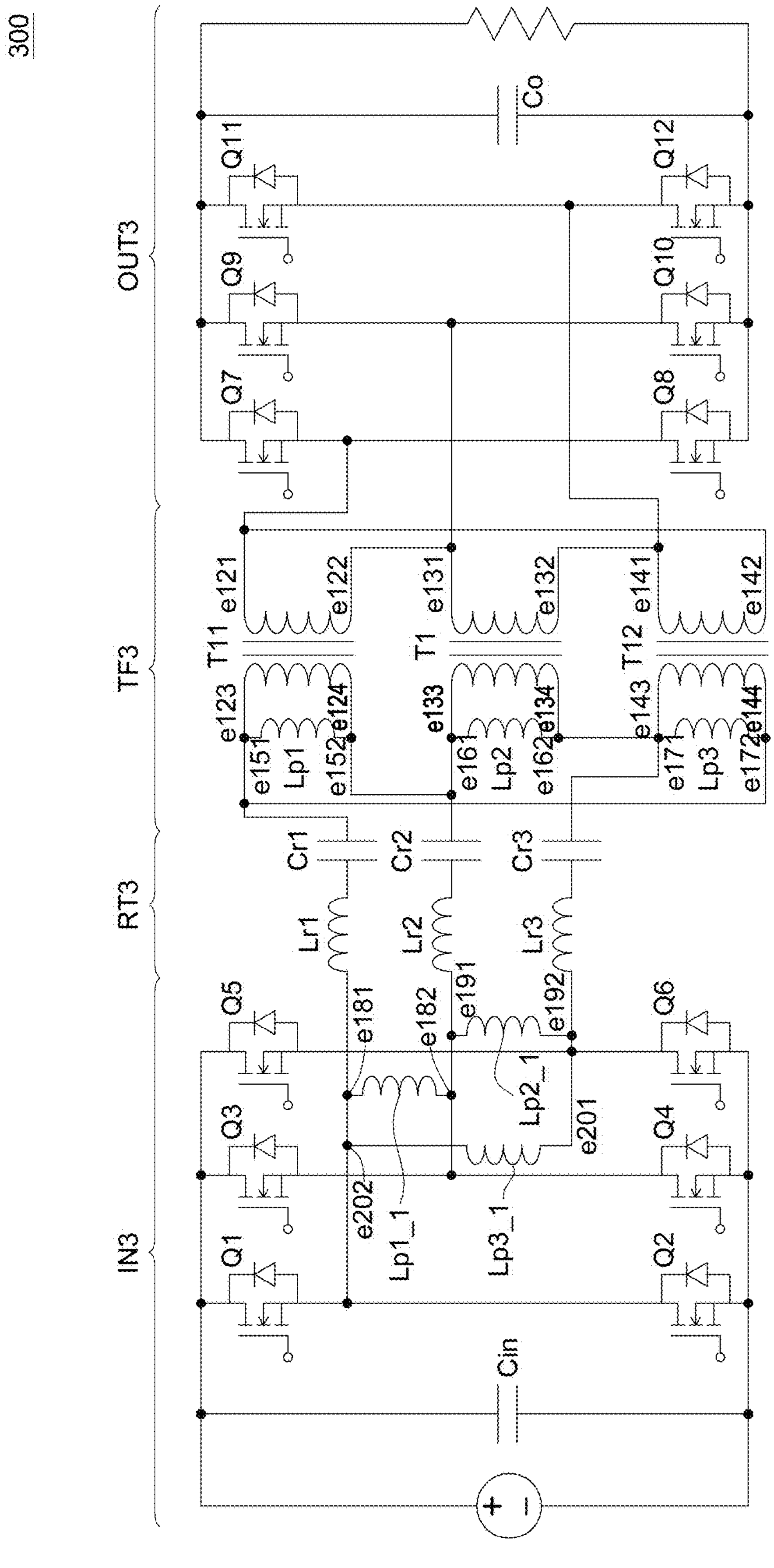
FIG. 7 illustrates a circuit diagram of an LLC resonance conversion circuit according to another embodiment of the present disclosure.

Please refer to FIG. 7, which illustrates a circuit diagram of an LLC resonance conversion circuit 300 according to another embodiment of the present disclosure. The LLC resonance conversion circuit 300 includes a primary side network IN3, a transformer TF3, a primary side resonance circuit RT3 and a secondary side network OUT3. The primary side network IN3 includes six switch elements Q1, Q2, Q3, Q4, Q5, Q6 and an input capacitor Cin. Each of the switch elements Q1, Q2, Q3, Q4, Q5, Q6 includes a transistor and a diode. The switch element Q1 and the switch element Q2 are connected in series. The switch element Q3 and the switch element Q4 are connected in series. The switch element Q5 and the switch element Q6 are connected in series. The switch element Q1 and the switch element Q2 connected in series are connected in parallel to the input capacitor Cin; the switch element Q3 and the switch element Q4 connected in series are connected in parallel to the input capacitor Cin; the switch element Q5 and the switch element Q6 connected in series are connected in parallel to the input capacitor Cin.

The transformer TF3 includes three coils T1, T11, T12 and three excitation inductors Lp1, Lp2, Lp3.

In one embodiment, the three coils T1, T11, T12 of the transformer TF3 are connected in a triangle-shaped connection. That is to say, the second terminal e122 on the lower right side of the coil T11 is connected to the first terminal e131 on the upper right side of the coil T1; the second terminal e132 on the lower right side of the coil T1 is connected to the first terminal e141 on the upper right side of the coil T12; the second terminal e142 on the lower right side of the coil T12 is connected to the first terminal e121 on the upper right side of the coil T11; the fourth terminal e124 on the lower left side of the coil T11 is connected to the third terminal e133 on the upper left side of the coil T1; the fourth terminal e134 on the lower left side of the coil T1 is connected to the third terminal e143 on the upper left side of the coil T12; the fourth terminal e144 on the lower left side of the coil T12 is connected to the third terminal e123 on the upper left side of the coil T11.

The first terminal e151 and the second terminal e152 of the excitation inductor Lp1 are connected to the coil T11.

The first terminal e161 and the second terminal e162 of the excitation inductor Lp2 are connected to the coil T1. The first terminal e171 and the second terminal e172 of the excitation inductor Lp3 are connected to the coil T12. The first terminal e151 of the excitation inductor Lp1 is connected to a node between the resonance capacitor Cr1 and the coil T11. The first terminal e161 of the excitation inductor Lp2 is connected to a node between the resonance capacitor Cr2 and the coil T1. The first terminal e171 of the excitation inductor Lp3 is connected to a node between the resonance capacitor Cr3 and the coil T12.

The excitation inductor Lp1, the excitation inductor Lp2 and the excitation inductor Lp3 of the transformer TF3 are connected in a triangle-shaped connection. That is to say, the second terminal e152 of the excitation inductor Lp1 is connected to the first terminal e161 of the excitation inductor Lp2, the second terminal e162 of the excitation inductor Lp2 is connected to the first terminal e171 of the excitation inductor Lp3, the second terminal e172 of the excitation inductor Lp3 is connected to the first terminal e151 of the excitation inductor Lp1.

The primary side resonance circuit RT3 includes three resonance capacitors Cr1, Cr2, Cr3, three resonance inductors Lr1, Lr2, L3 and three inductors Lp1_1, Lp2_1, Lp3_1. The resonance capacitor Cr1 and the resonance inductor Lr1 are connected in series between the coil T11 and the primary side network IN3. The resonance capacitor Cr2 and the resonance inductor Lr2 are connected in series between the coil T1 and the primary side network IN3. The resonance capacitor Cr3 and the resonance inductor Lr3 are connected in series between the coil T12 and the primary side network IN3.

The inductor Lp1_1, the inductor Lp2_1 and the inductor Lp3_1 are connected in a triangle-shaped connection. That is to say, the second terminal e182 of the inductor Lp1_1 is connected to the first terminal e191 of the inductor Lp2_1, the second terminal e192 of the inductor Lp2_1 is connected to the first terminal e201 of the inductor Lp3_1, the second terminal e202 of the inductor Lp3_1 is connected to the first terminal e181 of the inductor Lp1_1.

The secondary side network OUT3 includes six switch elements Q7, Q8, Q9, Q10, Q11, Q12 and an output capacitor Co. The secondary side network OUT3 is connected to the coils T1, T11, T12. Each of the switch elements Q7, Q8, Q9, Q10, Q11, Q12 includes a transistor and a diode. The switch element Q7 and the switch element Q8 are connected in series. The switch element Q9 and the switch element Q10 are connected in series. The switch element Q11 and the switch element Q12 are connected in series. The switch element Q7 and the switch element Q8 connected in series are connected in parallel to the output capacitor Co, the switch element Q9 and the switch element Q10 connected in series in parallel to the output capacitor Co, the switch element Q11 and the switch element Q12 connected in series in parallel to the output capacitor Co.

In one embodiment, the secondary side network OUT3 is directly connected to the coils T1, T11, T12, and there is no resonance capacitor or resonance inductor disposed between the secondary side network OUT3 and the coils T1, T11, T12.

As shown in the LLC resonance conversion circuit 200 of the FIG. 4, the coils T1, T11, T12 are connected in a Y-shaped connection; the excitation inductors Lp1, Lp2, Lp3 are connected in the Y-shaped connection, and the inductors Lp1_1, Lp2_1, Lp3_1 are connected in the Y-shaped connection. As shown in the LLC resonance conversion circuit 300 of the FIG. 7, the coils T1, T11, T12 are connected in the triangle-shaped connection, the excitation inductors Lp1, Lp2, Lp3 are connected in the triangle-shaped connection, and the inductors Lp1_1, Lp2_1, Lp3_1 are connected in the triangle-shaped connection.

In other embodiments, the coils T1, T11, T12 could be connected in a Y-shaped connection or a triangle-shaped connection, the excitation inductors Lp1, Lp2, Lp3 could be connected in a Y-shaped connection or a triangle-shaped connection, and the inductors Lp1_1, Lp2_1, Lp3_1 could be connected in a Y-shaped connection or a triangle-shaped connection. The connection could be arbitrarily matched. Y-shaped connection or triangle-shaped connection are both within the scope of the present disclosure. Examples are given below.

Figure 8:
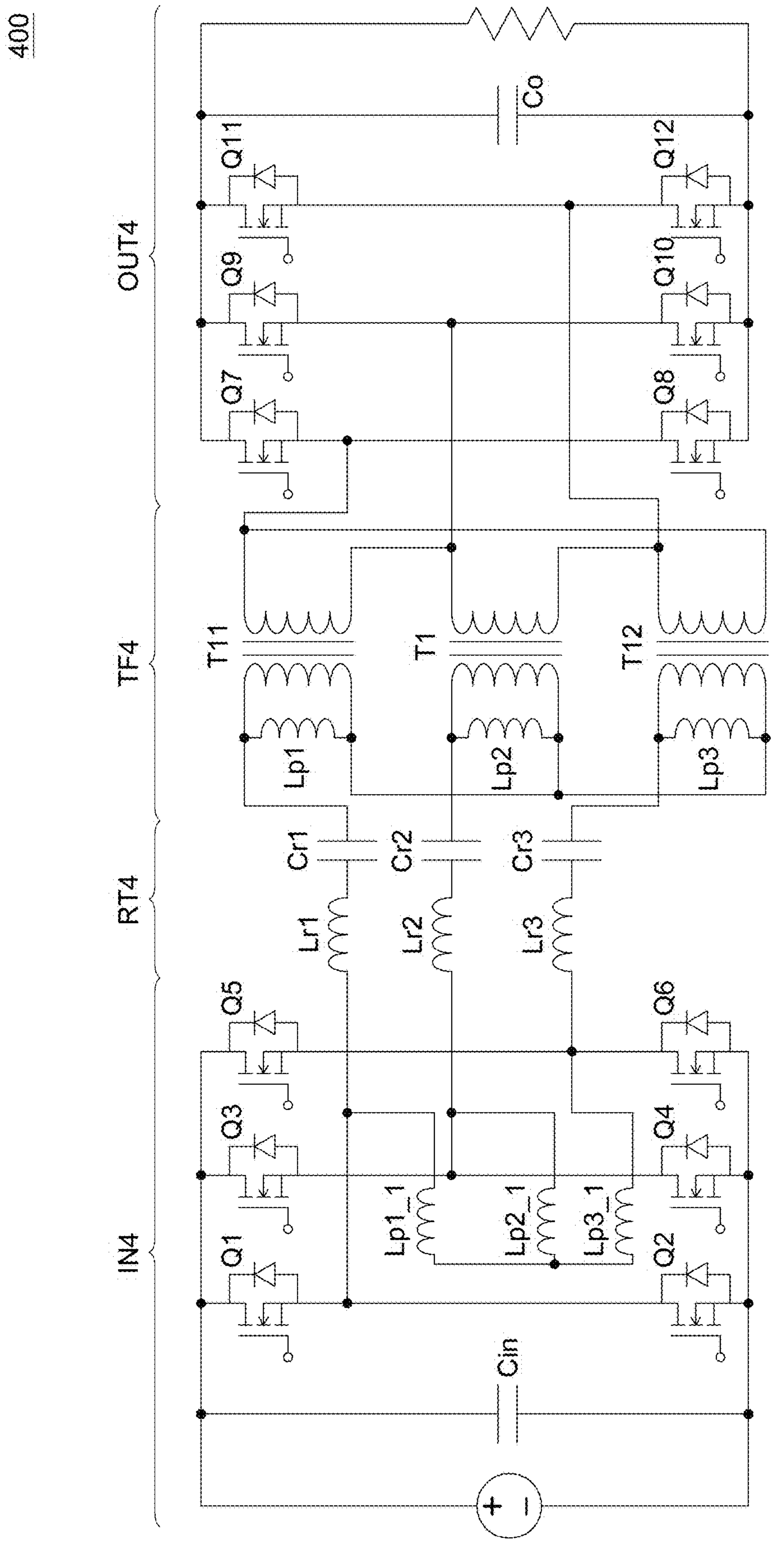
FIG. 8 illustrates a circuit diagram of an LLC resonance conversion circuit according to another embodiment of the present disclosure.

Please refer to FIG. 8, which illustrates a circuit diagram of an LLC resonance conversion circuit 400 according to another embodiment of the present disclosure. The LLC resonance conversion circuit 400 includes a primary side network IN4, a transformer TF4, a primary side resonance circuit RT4 and a secondary side network OUT4. The primary side network IN4 includes six switch elements Q1, Q2, Q3, Q4, Q5, Q6 and an input capacitor Cin. Each of the switch elements Q1, Q2, Q3, Q4, Q5, Q6 includes a transistor and a diode. The switch element Q1 and the switch element Q2 are connected in series, the switch element Q3 and the switch element Q4 are connected in series, the switch element Q5 and the switch element Q6 are connected in series. The switch element Q1 and the switch element Q2 connected in series are connected in parallel to the input capacitor Cin, the switch element Q3 and the switch element Q4 connected in series are connected in parallel to the input capacitor Cin, and the switch element Q5 and the switch element Q6 connected in series are connected in parallel to the input capacitor Cin.

The transformer TF4 includes three coils T1, T11, T12 and three excitation inductors Lp1, Lp2, Lp3.

In one embodiment, the three coils T1, T11, T12 of the transformer TF4 are connected in a triangle-shaped connection. The excitation inductors Lp1, Lp2, Lp3 of the transformer TF4 are connected in a Y-shaped connection.

The primary side resonance circuit RT4 includes three resonance capacitors Cr1, Cr2, Cr3, three resonance inductors Lr1, Lr2, L3 and three inductors Lp1_1, Lp2_1, Lp3_1. The resonance capacitor Cr1 and the resonance inductor Lr1 are connected in series between the coil T11 and the primary side network IN4. The resonance capacitor Cr2 and the resonance inductor Lr2 are connected in series between the coil T1 and the primary side network IN4. The resonance capacitor Cr3 and the resonance inductor Lr3 are connected in series between the coil T12 and the primary side network IN4.

The inductor Lp1_1, the inductor Lp2_1 and the inductor Lp3_1 are connected in a triangle-shaped connection.

The secondary side network OUT4 includes six switch elements Q7, Q8, Q9, Q10, Q11, Q12 and an output capacitor Co. The secondary side network OUT4 is connected to the coils T1, T11, T12. Each of the switch elements Q7, Q8, Q9, Q10, Q11, Q12 includes a transistor and a diode. The switch element Q7 and the switch element Q8 are connected in series. The switch element Q9 and the switch element Q10 are connected in series. The switch element Q11 and the switch element Q12 are connected in series. The switch element Q7 and the switch element Q8 connected in series are connected in parallel to the output capacitor Co. The switch element Q9 and the switch element Q10 connected in series are connected in parallel to the output capacitor Co.

The switch element Q11 and the switch element Q12 connected in series are connected in parallel to the output capacitor Co.

In one embodiment, the secondary side network OUT4 is directly connected to the coils T1, T11, T12, and there is no resonance capacitor or resonance inductor disposed between the secondary side network OUT4 and the coils T1, T11, T12.

Figure 9:
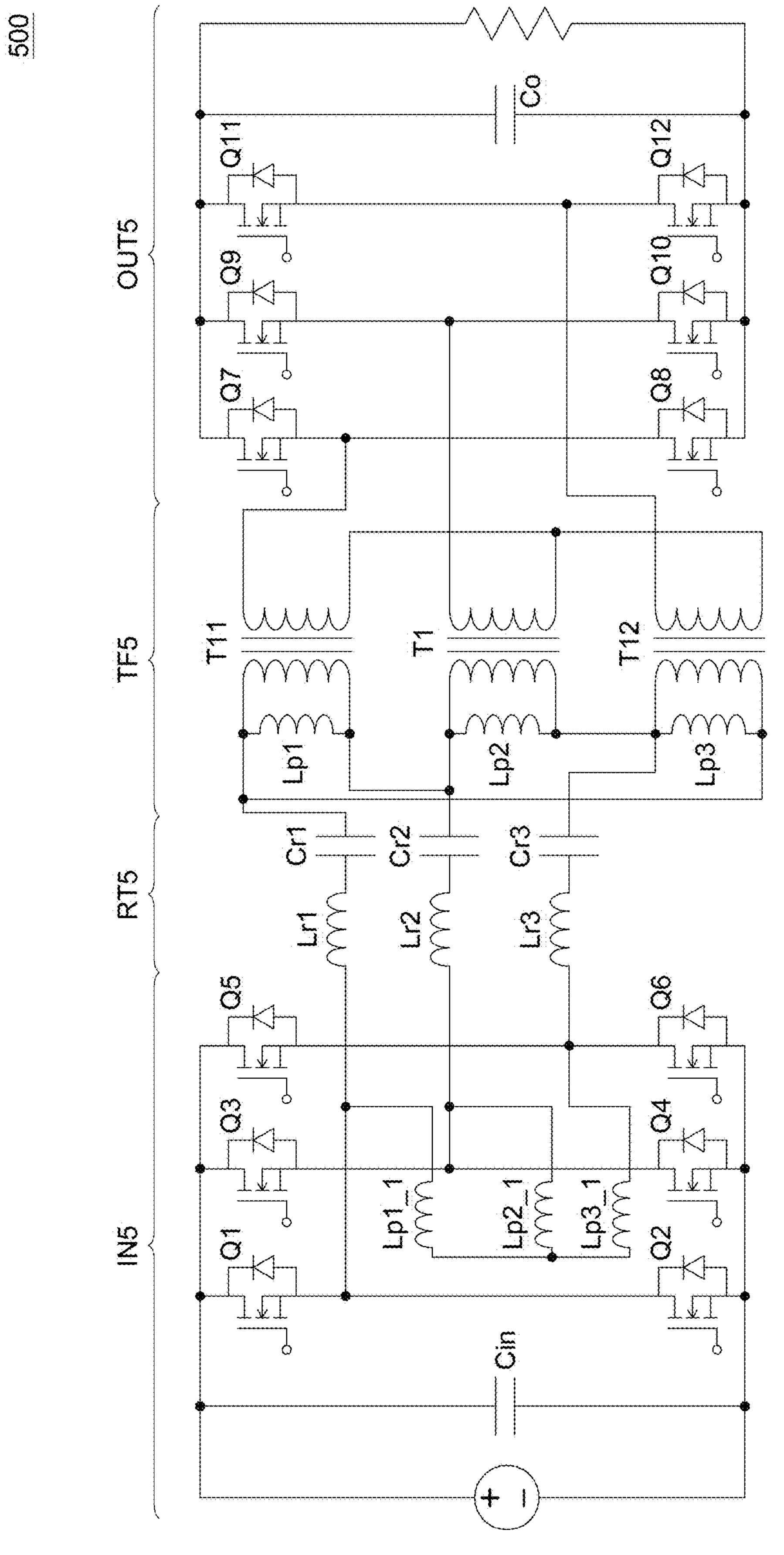
FIG. 9 illustrates a circuit diagram of an LLC resonance conversion circuit according to another embodiment of the present disclosure.

Please refer to FIG. 9, which illustrates a circuit diagram of an LLC resonance conversion circuit 500 according to another embodiment of the present disclosure. The LLC resonance conversion circuit 500 includes a primary side network IN5, a transformer TF5, a primary side resonance circuit RT5 and a secondary side network OUT5. The primary side network IN5 includes six switch elements Q1, Q2, Q3, Q4, Q5, Q6 and an input capacitor Cin. Each of the switch elements Q1, Q2, Q3, Q4, Q5, Q6 includes a transistor and a diode. The switch element Q1 and the switch element Q2 are connected in series. The switch element Q3 and the switch element Q4 are connected in series. The switch element Q5 and the switch element Q6 are connected in series. The switch element Q1 and the switch element Q2 connected in series are connected in parallel to the input capacitor Cin. The switch element Q3 and the switch element Q4 connected in series are connected in parallel to the input capacitor Cin. The switch element Q5 and the switch element Q6 connected in series are connected in parallel to the input capacitor Cin.

The transformer TF5 includes three coils T1, T11, T12 and three excitation inductors Lp1, Lp2, Lp3.

In one embodiment, the three coils T1, T11, T12 of the transformer TF5 are connected in a Y-shaped connection. The excitation inductors Lp1, Lp2, Lp3 of the transformer TF5 are connected in a triangle-shaped connection.

The primary side resonance circuit RT5 includes three resonance capacitors Cr1, Cr2, Cr3, three resonance inductors Lr1, Lr2, L3 and three inductors Lp1_1, Lp2_1, Lp3_1. The resonance capacitor Cr1 and the resonance inductor Lr1 are connected in series between the coil T11 and the primary side network IN5. The resonance capacitor Cr2 and the resonance inductor Lr2 are connected in series between the coil T1 and the primary side network IN5. The resonance capacitor Cr3 and the resonance inductor Lr3 are connected in series between the coil T12 and the primary side network IN5.

The inductor Lp1_1, the inductor Lp2_1 and the inductor Lp3_1 are connected in a Y-shaped connection.

The secondary side network OUT5 includes six switch elements Q7, Q8, Q9, Q10, Q11, Q12 and an output capacitor Co. The secondary side network OUT5 is connected to the coils T1, T11, T12. Each of the switch elements Q7, Q8, Q9, Q10, Q11, Q12 includes a transistor and a diode. The switch element Q7 and the switch element Q8 are connected in series. The switch element Q9 and the switch element Q10 are connected in series. The switch element Q11 and the switch element Q12 are connected in series. The switch element Q7 and the switch element Q8 connected in series are connected in parallel to the output capacitor Co. The switch element Q9 and the switch element Q10 connected in series are connected in parallel to the output capacitor Co. The switch element Q11 and the switch element Q12 connected in series are connected in parallel to the output capacitor Co.

In one embodiment, the secondary side network OUT5 is directly connected to the coils T1, T11, T12, and there is no resonance capacitor or resonance inductor disposed between the secondary side network OUT5 and the coils T1, T11, T12.

Figure 10:
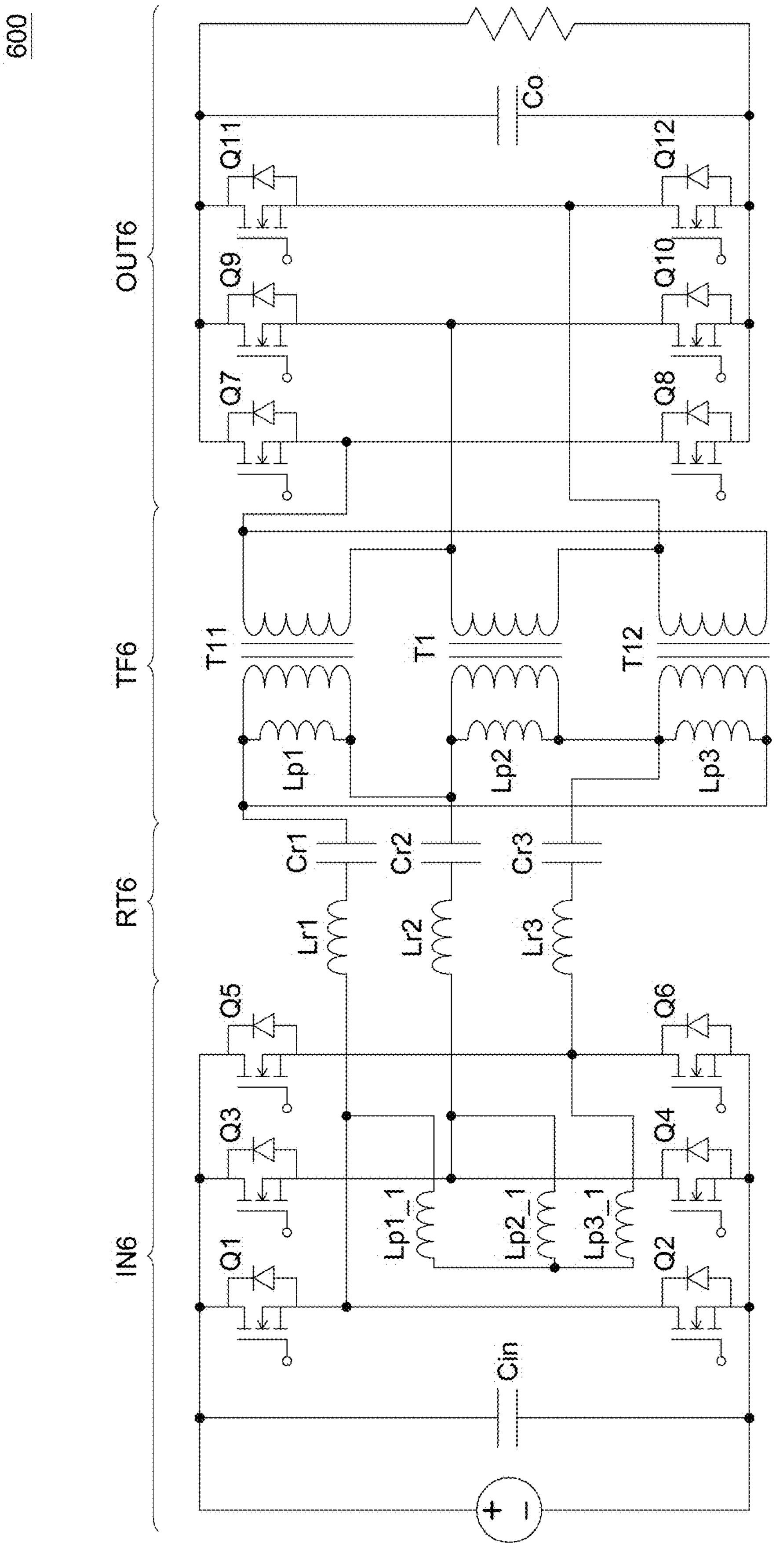
FIG. 10 illustrates a circuit diagram of an LLC resonance conversion circuit according to another embodiment of the present disclosure.

Please refer to FIG. 10, which illustrates a circuit diagram of an LLC resonance conversion circuit 600 according to another embodiment of the present disclosure. The LLC resonance conversion circuit 600 includes a primary side network IN6, a transformer TF6, a primary side resonance circuit RT6 and a secondary side network OUT6. The primary side network IN6 includes six switch elements Q1, Q2, Q3, Q4, Q5, Q6 and an input capacitor Cin. Each of the switch elements Q1, Q2, Q3, Q4, Q5, Q6 includes a transistor and a diode. The switch element Q1 and the switch element Q2 are connected in series. The switch element Q3 and the switch element Q4 are connected in series. The switch element Q5 and the switch element Q6 are connected in series. The switch element Q1 and the switch element Q2 connected in series are connected in parallel to the input capacitor Cin. The switch element Q3 and the switch element Q4 connected in series are connected in parallel to the input capacitor Cin. The switch element Q5 and the switch element Q6 connected in series are connected in parallel to the input capacitor Cin.

The transformer TF6 includes three coils T1, T11, T12 and three excitation inductors Lp1, Lp2, Lp3.

In one embodiment, the three coils T1, T11, T12 of the transformer TF6 are connected in a triangle-shaped connection. The excitation inductors Lp1, Lp2, Lp3 of the transformer TF6 are connected in a triangle-shaped connection.

The primary side resonance circuit RT6 includes three resonance capacitors Cr1, Cr2, Cr3, three resonance inductors Lr1, Lr2, L3 and three inductors Lp1_1, Lp2_1, Lp3_1. The resonance capacitor Cr1 and the resonance inductor Lr1 are connected in series between the coil T11 and the primary side network IN6. The resonance capacitor Cr2 and the resonance inductor Lr2 are connected in series between the coil T1 and the primary side network IN6. The resonance capacitor Cr3 and the resonance inductor Lr3 are connected in series between the coil T12 and the primary side network IN6.

The inductor Lp1_1, the inductor Lp2_1 and the inductor Lp3_1 are connected in a Y-shaped connection.

The secondary side network OUT6 includes six switch elements Q7, Q8, Q9, Q10, Q11, Q12 and an output capacitor Co. The secondary side network OUT6 is connected to the coils T1, T11, T12. Each of the switch elements Q7, Q8, Q9, Q10, Q11, Q12 includes a transistor and a diode. The switch element Q7 and the switch element Q8 are connected in series. The switch element Q9 and the switch element Q10 are connected in series. The switch element Q11 and the switch element Q12 are connected in series. The switch element Q7 and the switch element Q8 connected in series are connected in parallel to the output capacitor Co. The switch element Q9 and the switch element Q10 connected in series are connected in parallel to the output capacitor Co. The switch element Q11 and the switch element Q12 connected in series are connected in parallel to the output capacitor Co.

In one embodiment, the secondary side network OUT6 is directly connected to the coils T1, T11, T12, and there is no resonance capacitor or resonance inductor disposed between the secondary side network OUT6 and the coil T1, T11, T12.

Figure 11:
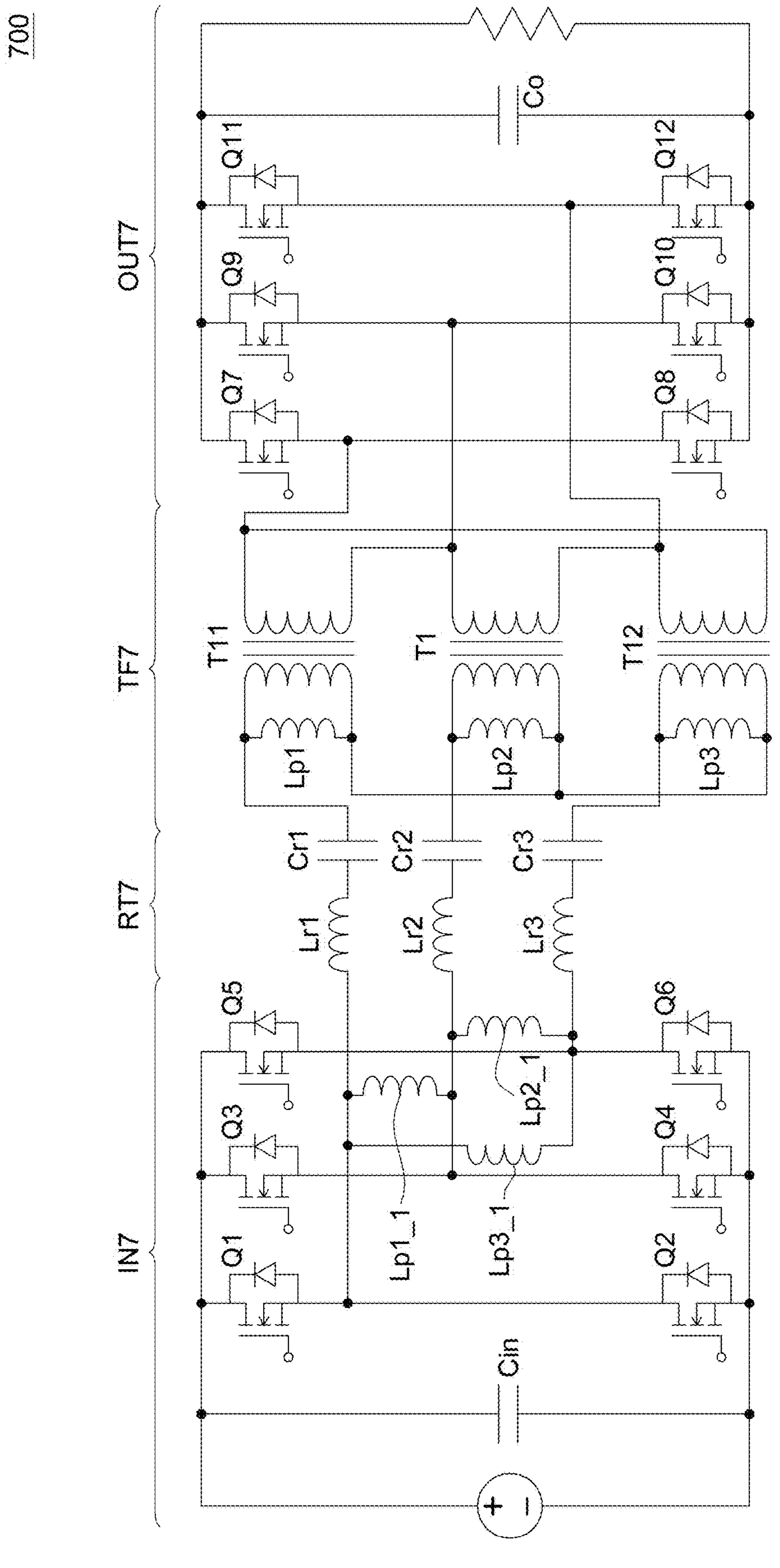
FIG. 11 illustrates a circuit diagram of an LLC resonance conversion circuit according to another embodiment of the present disclosure.

Please refer to FIG. 11, which illustrates a circuit diagram of an LLC resonance conversion circuit 700 according to another embodiment of the present disclosure. The LLC resonance conversion circuit 700 includes a primary side network IN7, a transformer TF7, a primary side resonance circuit RT7 and a secondary side network OUT7. The primary side network IN7 includes six switch elements Q1, Q2, Q3, Q4, Q5, Q6 and an input capacitor Cin. Each of the switch elements Q1, Q2, Q3, Q4, Q5, Q6 includes a transistor and a diode. The switch element Q1 and the switch element Q2 are connected in series. The switch element Q3 and the switch element Q4 are connected in series. The switch element Q5 and the switch element Q6 are connected in series. The switch element Q1 and the switch element Q2 connected in series are connected in parallel to the input capacitor Cin. The switch element Q3 and the switch element Q4 connected in series are connected in parallel to the input capacitor Cin. The switch element Q5 and the switch element Q6 connected in series are connected in parallel to the input capacitor Cin.

The transformer TF7 includes three coils T1, T11, T12 and three excitation inductors Lp1, Lp2, Lp3.

In one embodiment, the three coils T1, T11, T12 of the transformer TF7 are connected in a triangle-shaped connection. The excitation inductors Lp1, Lp2, Lp3 of the transformer TF7 are connected in a Y-shaped connection.

The primary side resonance circuit RT7 includes three resonance capacitors Cr1, Cr2, Cr3, three resonance inductors Lr1, Lr2, L3 and three inductors Lp1_1, Lp2_1, Lp3_1. The resonance capacitor Cr1 and the resonance inductor Lr1 are connected in series between the coil T11 and the primary side network IN7. The resonance capacitor Cr2 and the resonance inductor Lr2 are connected in series between the coil T1 and the primary side network IN7. The resonance capacitor Cr3 and the resonance inductor Lr3 are connected in series between the coil T12 and the primary side network IN7.

The inductor Lp1_1, the inductor Lp2_1 and the inductor Lp3_1 are connected in a triangle-shaped connection.

The secondary side network OUT7 includes six switch elements Q7, Q8, Q9, Q10, Q11, Q12 and an output capacitor Co. The secondary side network OUT7 is connected to the coils T1, T11, T12. Each of the switch elements Q7, Q8, Q9, Q10, Q11, Q12 includes a transistor and a diode. The switch element Q7 and the switch element Q8 are connected in series. The switch element Q9 and the switch element Q10 are connected in series. The switch element Q11 and the switch element Q12 are connected in series. The switch element Q7 and the switch element Q8 connected in series are connected in parallel to the output capacitor Co. The switch element Q9 and the switch element Q10 connected in series are connected in parallel to the output capacitor Co. The switch element Q11 and the switch element Q12 connected in series are connected in parallel to the output capacitor Co.

In one embodiment, the secondary side network OUT7 is directly connected to the coils T1, T11, T12, and there is no resonance capacitor or resonance inductor disposed between the secondary side network OUT7 and the coils T1, T11, T12.

Figure 12:
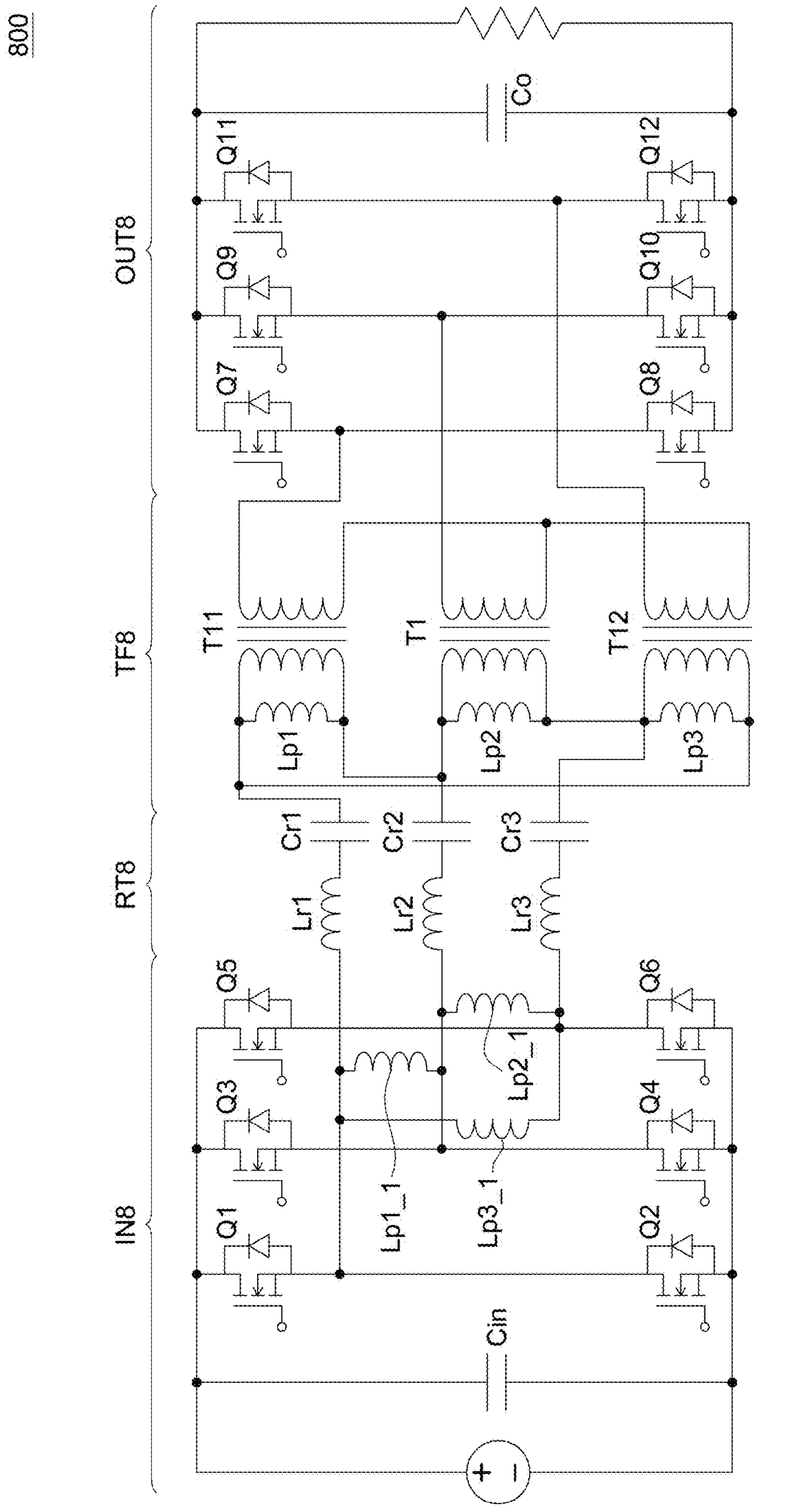
FIG. 12 illustrates a circuit diagram of an LLC resonance conversion circuit according to another embodiment of the present disclosure.

Please refer to FIG. 12, which illustrates a circuit diagram of an LLC resonance conversion circuit 800 according to another embodiment of the present disclosure. The LLC resonance conversion circuit 800 includes a primary side network IN8, a transformer TF8, a primary side resonance circuit RT8 and a secondary side network OUT8. The primary side network IN8 includes six switch elements Q1, Q2, Q3, Q4, Q5, Q6 and an input capacitor Cin. Each of the switch elements Q1, Q2, Q3, Q4, Q5, Q6 includes a transistor and a diode. The switch element Q1 and the switch element Q2 are connected in series. The switch element Q3 and the switch element Q4 are connected in series. The switch element Q5 and the switch element Q6 are connected in series. The switch element Q1 and the switch element Q2 connected in series are connected in parallel to the input capacitor Cin. The switch element Q3 and the switch element Q4 connected in series are connected in parallel to the input capacitor Cin. The switch element Q5 and the switch element Q6 connected in series are connected in parallel to the input capacitor Cin.

The transformer TF8 includes three coils T1, T11, T12 and three excitation inductors Lp1, Lp2, Lp3.

In one embodiment, the three coils T1, T11, T12 of the transformer TF8 are connected in a Y-shaped connection. The excitation inductors Lp1, Lp2, Lp3 of the transformer TF8 are connected in a triangle-shaped connection.

The primary side resonance circuit RT8 includes three resonance capacitors Cr1, Cr2, Cr3, three resonance inductors Lr1, Lr2, L3 and three inductors Lp1_1, Lp2_1, Lp3_1. The resonance capacitor Cr1 and the resonance inductor Lr1 are connected in series between the coil T11 and the primary side network IN8. The resonance capacitor Cr2 and the resonance inductor Lr2 are connected in series between the coil T1 and the primary side network IN8. The resonance capacitor Cr3 and the resonance inductor Lr3 are connected in series between the coil T12 and the primary side network IN8.

The inductor Lp1_1, the inductor Lp2_1 and the inductor Lp3_1 are connected in a triangle-shaped connection.

The secondary side network OUT8 includes six switch elements Q7, Q8, Q9, Q10, Q11, Q12 and an output capacitor Co. The secondary side network OUT8 is connected to the coils T1, T11, T12. Each of the switch elements Q7, Q8, Q9, Q10, Q11, Q12 includes a transistor and a diode. The switch element Q7 and the switch element Q8 are connected in series. The switch element Q9 and the switch element Q10 are connected in series. The switch element Q11 and the switch element Q12 are connected in series. The switch element Q7 and the switch element Q8 are connected in parallel to the output capacitor Co. The switch element Q9 and the switch element Q10 are connected in parallel to the output capacitor Co. The switch element Q11 and the switch element Q12 are connected in parallel to the output capacitor Co.

In one embodiment, the secondary side network OUT8 is directly connected to the coils T1, T11, T12, and there is no resonance capacitor or resonance inductor disposed between the secondary side network OUT8 and the coils T1, T11, T12.

Figure 13:
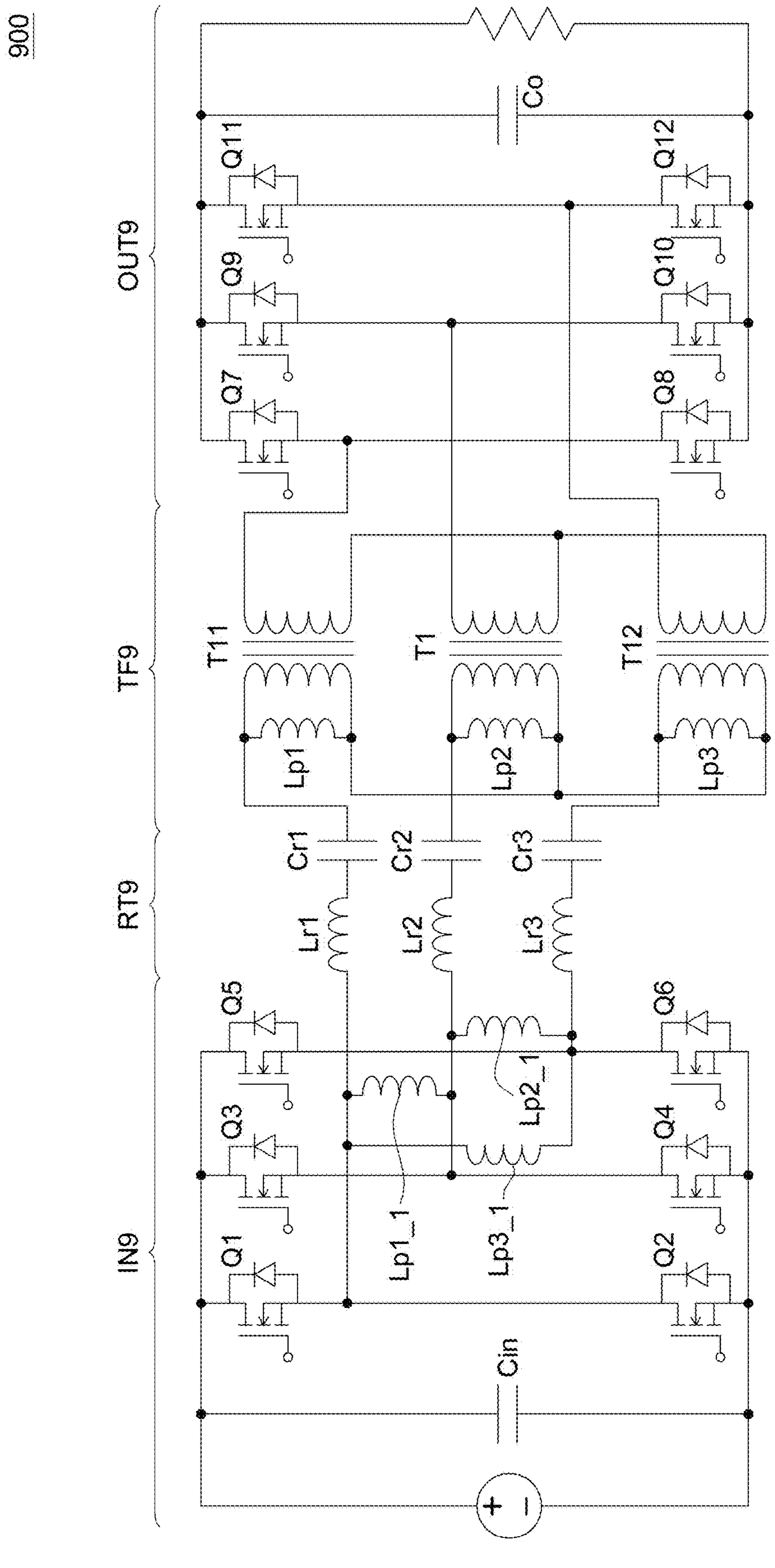
FIG. 13 illustrates a circuit diagram of an LLC resonance conversion circuit according to another embodiment of the present disclosure.

Please refer to FIG. 13, which illustrates a circuit diagram of an LLC resonance conversion circuit 900 according to another embodiment of the present disclosure. The LLC resonance conversion circuit 900 includes a primary side network IN9, a transformer TF9, a primary side resonance circuit RT9 and a secondary side network OUT9. The primary side network IN9 includes six switch elements Q1, Q2, Q3, Q4, Q5, Q6 and an input capacitor Cin. Each of the switch elements Q1, Q2, Q3, Q4, Q5, Q6 includes a transistor and a diode. The switch element Q1 and the switch element Q2 are connected in series. The switch element Q3 and the switch element Q4 are connected in series. The switch element Q5 and the switch element Q6 are connected in series. The switch element Q1 and the switch element Q2 connected in series are connected in parallel to the input capacitor Cin. The switch element Q3 and the switch element Q4 connected in series are connected in parallel to the input capacitor Cin. The switch element Q5 and the switch element Q6 connected in series are connected in parallel to the input capacitor Cin.

The transformer TF9 includes three coils T1, T11, T12 and three excitation inductors Lp1, Lp2, Lp3.

In one embodiment, the three coils T1, T11, T12 of the transformer TF9 are connected in a Y-shaped connection. The excitation inductors Lp1, Lp2, Lp3 of the transformer TF9 are connected in a Y-shaped connection.

The primary side resonance circuit RT9 includes three resonance capacitors Cr1, Cr2, Cr3, three resonance inductors Lr1, Lr2, L3 and three inductors Lp1_1, Lp2_1, Lp3_1. The resonance capacitor Cr1 and the resonance inductor Lr1 are connected in series between the coil T11 and the primary side network IN9. The resonance capacitor Cr2 and the resonance inductor Lr2 are connected in series between the coil T1 and the primary side network IN9. The resonance capacitor Cr3 and the resonance inductor Lr3 are connected in series between the coil T12 and the primary side network IN9.

The inductor Lp1_1, the inductor Lp2_1 and the inductor Lp3_1 are connected in a triangle-shaped connection.

The secondary side network OUT9 includes six switch elements Q7, Q8, Q9, Q10, Q11, Q12 and an output capacitor Co. The secondary side network OUT9 is connected to the coils T1, T11, T12. Each of the switch elements Q7, Q8, Q9, Q10, Q11, Q12 includes a transistor and a diode. The switch element Q7 and the switch element Q8 are connected in series. The switch element Q9 and the switch element Q10 are connected in series. The switch element Q11 and the switch element Q12 are connected in series. The switch element Q7 and the switch element Q8 are connected in parallel to the output capacitor Co. The switch element Q9 and the switch element Q10 are connected in parallel to the output capacitor Co. The switch element Q11 and the switch element Q12 are connected in parallel to the output capacitor Co.

In one embodiment, the secondary side network OUT9 is connected to the coils T1, T11, T12, and no resonance capacitor or resonance inductor is disposed between the secondary side network OUT9 and the coils T1, T11, T12.

According to the embodiments, the secondary side networks OUT1 to OUT9 are directly connected to the coils T1, T11, T12, and there is no resonance capacitor or resonance inductor disposed between the secondary side network OUT1 to OUT9 and the coils T1, T11, T12. Therefore, the size and cost of the resonance capacitor or the resonance inductor could be saved.

In addition, after eliminating the resonance capacitor or resonance inductor on the secondary side, the inductors Lp1_1, Lp2_1 and Lp3_1 used in this embodiment could still realize the LLC circuit architecture in the inverse operating mode and improve the gain of the inverse operating mode.

Furthermore, since the resonance capacitor or resonance inductor in the secondary side is omitted, the resonance inductors Lr, Lr1, Lr2, Lr3 of the primary side resonance circuits RT1 to RT9 and the secondary side excitation inductors Lp1, Lp2, Lp3 of the transformers TF1 to TF9 could be more flexibly adjusted to successfully achieve optimal gain.

Figure 14:
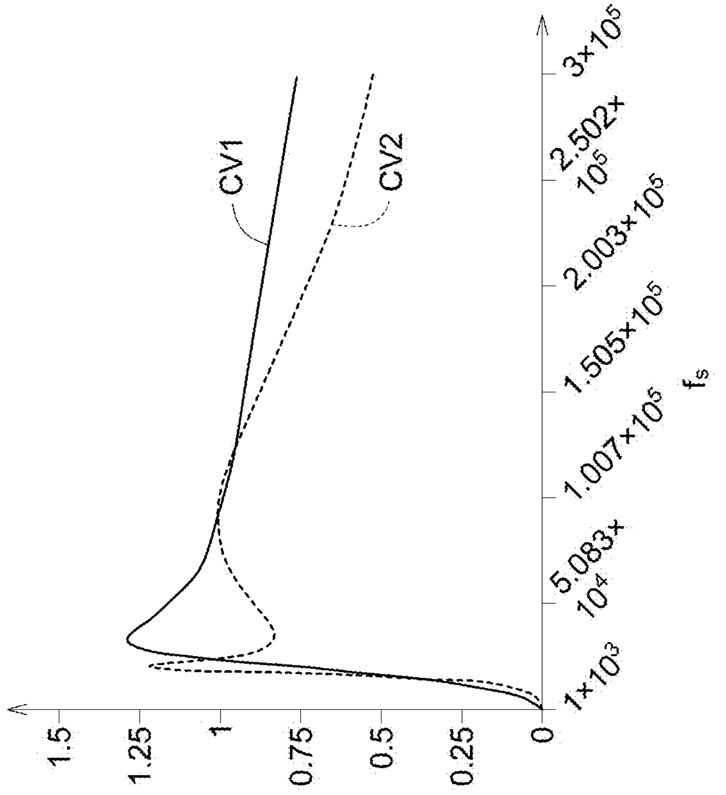
FIG. 14 shows the gain curve of the CLLLC and the parallel inductor of the present disclosure under the same output and load conditions in the inverse operating mode.

Please refer to FIG. 14, which shows the gain curve of the CLLLC and the parallel inductor of the present disclosure under the same output and load conditions in the inverse operating mode. The curve CV1 is the parallel inductor topological gain disclosed in this disclosure. The curve CV2 is the CLLLC topology gain. As shown from the FIG. 14, the parallel inductor design used in this embodiment has a more linear and larger gain than CLLLC.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. An LLC resonance conversion circuit, comprising:

a primary side network, including a plurality of switch elements and an input capacitor;

at least one transformer, including at least one coil and at least one excitation inductor;

a primary side resonance circuit, including at least one resonance capacitor, at least one resonance inductor, at least one auxiliary inductor and a second switch, wherein the at least one resonance capacitor and the at least one resonance inductor are connected in series between the at least one coil and the primary side network, two terminals of the at least one excitation inductor are connected to the at least one coil, the at least one auxiliary inductor is connected to the at least one resonance inductor, and the second switch is used to control a connection state of a path between the at least one auxiliary inductor and the at least one excitation inductor; and a secondary side network, including a plurality of switch elements and an output capacitor, wherein the secondary side network is connected to the at least one coil.

2. The LLC resonance conversion circuit according to claim 1, wherein the primary side resonance circuit further includes:

a first switch, connected to one terminal of the at least one auxiliary inductor, wherein the second switch is connected to another terminal of the at least one auxiliary inductor.

3. The LLC resonance conversion circuit according to claim 2, wherein in a forward operating mode, the first switch and the second switch are turned off; and in an inverse operating mode, the first switch and the second switch are turned on.

4. The LLC resonance conversion circuit according to claim 1, wherein the secondary side network is directly connected to the at least one coil.

5. The LLC resonance conversion circuit according to claim 1, wherein one terminal of the at least one auxiliary inductor is connected between the at least one resonance inductor and the primary side network.

6. The LLC resonance conversion circuit according to claim 5, wherein another terminal of the at least one auxiliary inductor is connected between the at least one coil and the primary side network.

7. The LLC resonance conversion circuit according to claim 1, wherein the at least one coil includes three coils, the at least one resonance capacitor includes three resonance capacitors, the at least one resonance inductor includes three resonance inductors, the at least one excitation inductor includes three excitation inductors, the at least one auxiliary inductor includes three auxiliary inductors, the three coils, the three resonance capacitors, the three resonance inductors, the three excitation inductors, the three auxiliary inductors have identical quantities and correspond to each other, each of the three resonance capacitors and each of the three resonance inductors corresponding thereto are connected in series between each of the three coils and the primary side network, two terminals of each of the three excitation inductors are connected to each of the coils corresponding thereto, and each of the three auxiliary inductors is connected to each of the three resonance inductors corresponding thereto.

8. The LLC resonance conversion circuit according to claim 7, wherein the secondary side network is directly connected to the three coils.

9. The LLC resonance conversion circuit according to claim 7, wherein one terminal of each of the three auxiliary inductors is connected between each of the three resonance inductors corresponding thereto and the primary side network.

10. The LLC resonance conversion circuit according to claim 7, wherein corresponding terminals of the three auxiliary inductors are connected together.

11. The LLC resonance conversion circuit according to claim 7, wherein the three auxiliary inductors are connected in a ring.

12. An LLC resonance conversion circuit, comprising:

a primary side network, including four switch elements and an input capacitor;

a transformer, including a coil and an excitation inductor;

a primary side resonance circuit, including a resonance capacitor, a resonance inductor, an auxiliary inductor, a first switch and a second switch, wherein the resonance capacitor and the resonance inductor are connected in series between the coil and the primary side network, two terminals of the excitation inductor are connected to the coil, the first switch, the auxiliary inductor and the second switch are connected in series between the resonance inductor and the primary side network, and the second switch is used to control a connection state of a path between the auxiliary inductor and the excitation inductor; and a secondary side network, including four switch elements and an output capacitor, wherein the secondary side network is connected to the coil.

13. An LLC resonance conversion circuit, comprising:

a primary side network, including six switch elements and an input capacitor;

a transformer, including three coils and three excitation inductors;

a primary side resonance circuit, including three resonance capacitors, three resonance inductors and three auxiliary inductors, wherein each of the three resonance capacitors and each of the three resonance inductors corresponding thereto are connected in series between each of the three coils corresponding thereto and the primary side network, and two terminals of each of the three excitation inductors are connected to each of the three coils corresponding thereto, and each of the three auxiliary inductors is connected to each of the three resonance inductor inductors corresponding thereto; and a secondary side network, including six switch elements and an output capacitor, wherein the secondary side network is connected to the three coils;

wherein the three auxiliary inductors are connected in a ring.

* * * * *